April 3, 1951          E. P. CURRY          2,547,444
ROTARY DISK TILLER
Filed Aug. 2, 1946          2 Sheets-Sheet 1
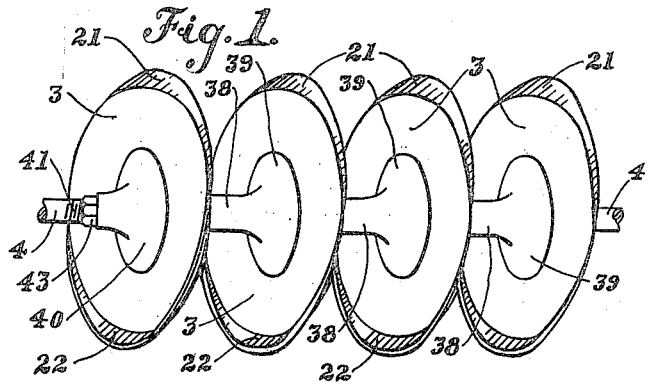
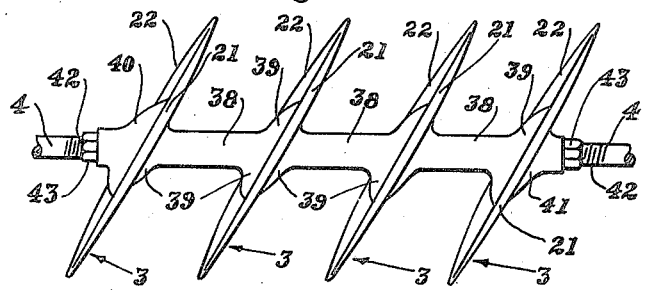
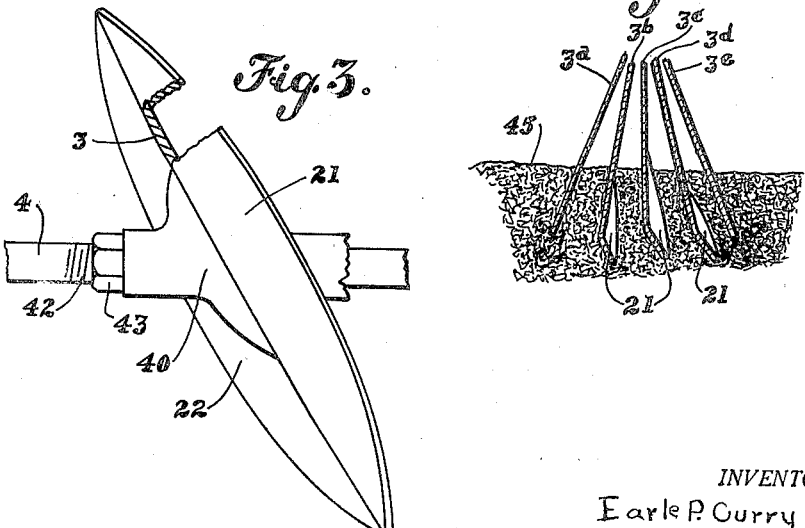
INVENTOR.
Earle P. Curry
BY Heard Smith & Tennant
Attorneys.

April 3, 1951
E. P. CURRY
2,547,444
ROTARY DISK TILLER
Filed Aug. 2, 1946
2 Sheets-Sheet 2
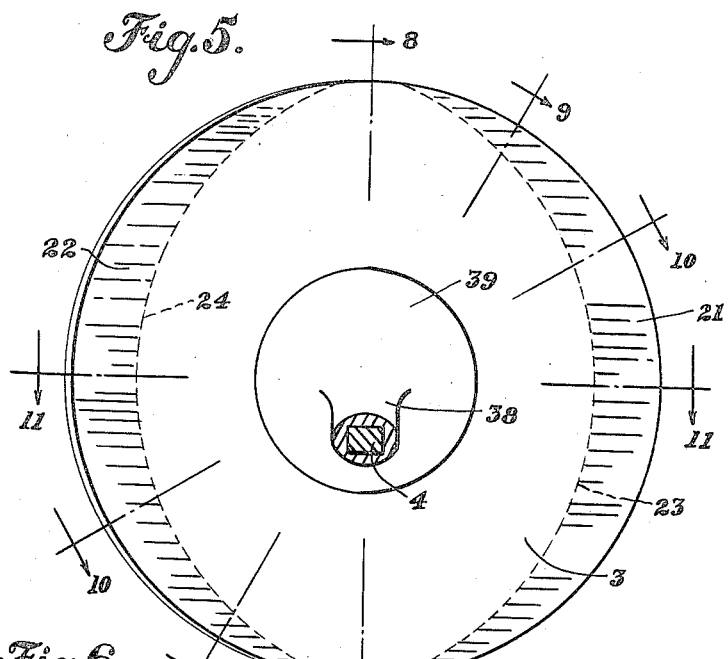
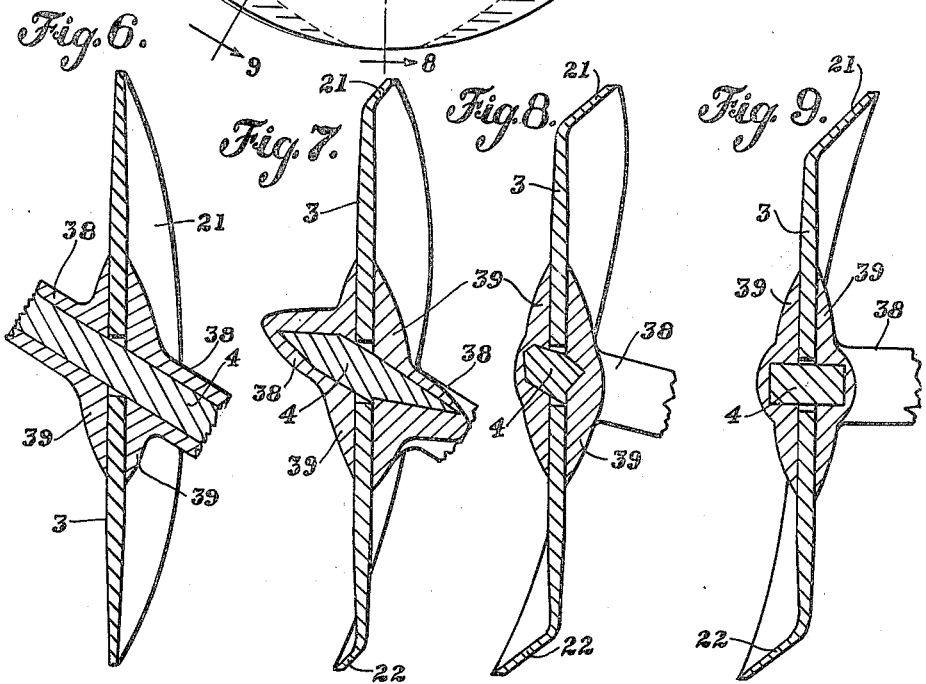
INVENTOR.
Earle P. Curry
BY
Heard Smith Tennant
Attorneys.

Patented Apr. 3, 1951

2,547,444

UNITED STATES PATENT OFFICE 2,547,444

ROTARY DISK TILLER

Earle P. Curry, Brockton, Mass.

Application August 2, 1946, Serial No. 688,088

4 Claims. (Cl. 97—220)

This invention relates to an earth-working machine in the form of a tiller designed for scarifying, pulverizing, and mixing top soil, and particularly to a machine of this type which is provided with a plurality of earth-working disks fast on a shaft and disposed in planes at an acute angle to the shaft, together with means for positively rotating the shaft, whereby the disks will have a wobbling motion as the shaft is rotated.

One of the objects of my present invention is to provide a disk of a novel construction which operates with increased effectiveness in pulverizing the top soil.

A further object of the invention is to provide a machine of this type which is equipped not only with the earth-pulverizing disks, but also with means for levelling the pulverized earth and a roller for rolling and firming the surface of the pulverized soil.

Other objects of the invention are to improve generally tillers or earth-pulverizing machines of this type in the particulars hereinafter set forth.

In the drawings wherein I have illustrated a selected embodiment of my invention:

Fig. 1 is a fragmentary view illustrating the construction of the pulverizing disks.

Fig. 2 is a view similar to Fig. 1, but showing the shaft turned into a 90° angle from the position shown in Fig. 1.

Fig. 3 is an edge view of one of the disks on an enlarged scale.

Fig. 4 is a more or less diagrammatic view illustrating the manner in which each disk operates to spoon up or pulverize the soil.

Fig. 5 is a side view of one of the disks.

Fig. 6 is a section on the line 8—8, Fig. 5.

Fig. 7 is a section on the line 9—9, Fig. 5.

Fig. 8 is a section on the line 10—10, Fig. 5.

Fig. 9 is a section on the line 11—11, Fig. 5.

My improved tiller comprises a plurality of earth-working disks 3 which are fast on a shaft 4 that is mounted for rotation in a suitable frame, the disks being disposed in parallel planes at an acute angle to the shaft as best seen in Figs. 1, 2 and 3.

The peripheral portions of each disk at the opposite ends of the diameter thereof which is perpendicular to the shaft 4 have an angular relation to the plane of the disk, the peripheral portion of each disk at one end of said diameter inclining in one direction relative to the body of the disk, and the peripheral portion at the other end of said diameter inclining in the other direction relative to the disk body.

Fig. 3 is a view of one of the disks 3 which is in a position on the shaft 4 so that the plane of the body of the disk extends at right angles to the plane of the sheet on which Fig. 3 of the drawing appears, and at the acute angle to the shaft 4 illustrated in said drawing. An imaginary diametrical line drawn on said disk 3 at right angles to the surface of the sheet on which Fig. 3 appears will have a right-angular relation with the shaft 4. Such a line corresponds to the line 11—11 in Fig. 5 which is an elevation of one of the disks 3 looking at said disk at right angles to its plane. In this view, the shaft 4 has an inclined position in a vertical plane at right angles to the plane of the disk 3.

The peripheral portions 21, 22 of the disk 3 at the opposite ends of such diametrical line corresponding to the line 11—11 in Fig. 5 have an angular relation to the plane of the disk as indicated in Figs. 7, 8, and 9. Each of the peripheral portions 21, 22 which have this angular relation have the greatest width at the ends of the diametrical line 11—11, such peripheral portions gradually decreasing in width from said diametrical line toward the diametrical line indicated at 8—8, Fig. 5, and on which the section of Fig. 6 is taken. The lines 23, 24 indicate approximately the lines along which the deflected or laterally disposed peripheral portions 21, 22 meet the body of the disk 3 which still occupies the inclined plane of the disk.

Each disk is so made that the angularly disposed peripheral portion 21 at one end of the diametrical line 11 inclines from the body of the disk in an opposite direction to the inclined peripheral portion 22 at the opposite end of said diametrical line so that the disk when cut on the line 11—11 will have the shape shown in Fig. 9.

The progressively decreasing width of each peripheral portion 21, 22 from the diametrical line 11 toward the diametrical line 8 is illustrated in Figs. 8 and 9, and at the diametrical line 8 the peripheral edge of the disk has no deflection.

Because of the inclined position of the disks 3, the portion of the disks which are in the soil will have a lateral movement in the soil as well as a rotary earth-cutting movement, and the shaft is rotated in such a direction that the inclined peripheral portion 21 or 22 will always be on the leading side of the disk with reference to such lateral motion. These angularly arranged peripheral portions 21, 22 of the disks will, therefore, have a sort of spooning or lifting action on the earth which will increase the ability of the disk to loosen and pulverize the soil over what would be accomplished by plane disks such as have been heretofore commonly used.

This is illustrated in Fig. 6 which shows various positions which the lower edge of one of the disks occupies in the soil during a half rotation of the disk. One position of the lower edge of the disk in the soil 45 corresponding to the position of the disk shown in Fig. 2 is indicated at 3a in Fig. 6. As the disk rotates, the lower edge of the disk which is in the soil will move laterally into the positions 3a, 3b, 3c, 3d, and 3e, the 3e position being the position when the disk has made a half revolution from the 3a position.

During this rotation of the disk and the lateral movement of the lower edge of the disk due to the inclined position thereof on the shaft, the inclined peripheral portion 21 of the disk will be carried through the earth and will have a spooning or lifting effect on the earth as stated above.

As the disk completes the other half of its rotation, the portion of the disk within the earth will be moving from the 3e to the 3a position, and at that time the inclined peripheral portion 22 will be working in the earth, said inclined peripheral portion 22 being on the opposite or left-hand side of the disk. Thus the inclined peripheral portion of that part of the disk which is in the soil is not only located on the leading face of the disk as it moves laterally through the soil, but is also inclining forwardly from said leading face.

It is intended that the shaft 4 should be rotated quite rapidly so that these disks will have a rapid rotation which will be very effective in pulverizing the soil. In fact, this device is intended to accomplish what would ordinarily be accomplished by the two operations of plowing and harrowing a field.

The disks 3 may be rigidly supported on the shaft 4 in any approved way. As herein shown, the shaft 4 is flat-sided, preferably square in cross section, and the disks 3 are held spaced apart by spacing elements 38, each spacing element having at each end an inclined flange portion 39 to engage one face of one of the disks. The aperture through each spacing member 38 is flat-sided to fit the cross sectional shape of the shaft 4.

The disks and the spacers 38 are clamped tightly together between two clamping heads 40 and 41 that engage the outside faces of the end disks. The shaft 4 is provided with screw threaded portions 42 which receive clamping nuts 43, the tightening of said nuts serving to clamp the disks 3 and spacers 38 firmly together.

I claim:

1. An earth-working element for an earth-working machine comprising a shaft and a plurality of disks fast thereon and disposed in spaced parallel planes at an acute angle to the shaft axis, the peripheral portion of each disk at the opposite ends of the diameter thereof which is perpendicular to the shaft having an angular relation to the plane of the disk, the peripheral portion at one end of said diameter being inclined outwardly from one side of the disk and that at the other end of said diameter being inclined outwardly from the other side of the disk.

2. An earth-working element for an earth-working machine comprising a shaft and a plurality of disks fast thereon and disposed in spaced parallel planes at an acute angle to the shaft axis, whereby the portion of each disk operating in the earth has, in addition to its rotary movement, a to-and-fro movement in the direction of the shaft axis during each rotation, the peripheral portion of that part of the disk which is in the soil at any time being inclined forwardly from the disk relative to its movement in the direction of the shaft axis.

3. An earth-working element for an earth-working machine comprising a shaft and a plurality of disks fast thereon and disposed in spaced parallel planes at an acute angle to the shaft axis, the peripheral portions of each disk at the opposite ends of the diameter thereof which is perpendicular to the shaft having an angular relation to the plane of the disk, the peripheral portion at one end of said diameter being inclined outwardly from one side of the disk and that at the other end of said diameter being inclined outwardly from the other side of the disk, the width of each outwardly inclined portion decreasing progressively from the end of said diameter.

4. An earth-working element for an earth-working machine comprising a shaft and a plurality of disks fast thereon and disposed in spaced parallel planes at an acute angle to the shaft axis, the peripheral portions of each disk at the opposite ends of the diameter thereof which is perpendicular to the shaft having an angular relation to the plane of the disk, the peripheral portion at one end of said diameter being inclined outwardly from one side of the disk and that at the other end of said diameter being inclined outwardly from the other side of the disk, the width of each outwardly inclined portion decreasing progressively from the end of said diameter in both directions along the periphery of the disk.

EARLE P. CURRY.

REFERENCES CITED

The following references are of record in the file of this patent:

UNITED STATES PATENTS

| Number | Name | Date |
|---|---|---|
| 467,400 | Denney et al. | Jan. 18, 1892 |
| 2,256,185 | Ariens | Sept. 16, 1941 |
| 2,342,031 | Bagan | Feb. 15, 1944 |
| 2,347,017 | Ariens | Apr. 18, 1944 |